United States Patent [19]

Baisier et al.

[11] Patent Number: 5,279,840

[45] Date of Patent: Jan. 18, 1994

[54] METHOD OF MAKING REDUCED FAT DEEP FRIED COMESTIBLES AND PRODUCT THEREOF

[75] Inventors: Wendy Baisier, St. Paul; William A. Barrier, Plymouth, both of Minn.

[73] Assignee: The Pillsbury Company, Minneapolis, Minn.

[21] Appl. No.: 896,289

[22] Filed: Jun. 10, 1992

[51] Int. Cl.⁵ ............................................. A23L 1/217
[52] U.S. Cl. ................... 426/102; 426/302; 426/438; 426/577; 426/578; 426/637; 426/654; 426/808
[58] Field of Search ............... 426/102, 302, 577, 637, 426/654, 438, 808, 578

[56] References Cited

U.S. PATENT DOCUMENTS

| | | | |
|---|---|---|---|
| 3,397,993 | 8/1968 | Strong | 99/100 |
| 3,424,591 | 1/1969 | Gold | 426/637 |
| 3,597,227 | 8/1971 | Murray et al. | 99/100 |
| 3,751,268 | 8/1973 | Van Patten et al. | 99/100 |
| 3,767,826 | 10/1973 | Fruin | 426/302 |
| 4,254,153 | 3/1981 | Ross et al. | 426/441 |
| 4,272,554 | 6/1981 | Schroeder et al. | 426/321 |
| 4,876,102 | 10/1989 | Feeney et al. | 426/637 |

*Primary Examiner*—Helen F. Pratt
*Attorney, Agent, or Firm*—Amy J. Hoffman; William J. Connors; John J. Gresens

[57] ABSTRACT

A method for producing reduced fat deep fried comestibles. The method particularly applies to preparing french fries from whole potatoes. The method involves coating the comestible with a mixture of ungelatinized amylose and calcium, blanching the coated comestible, dehydrating the blanched comestible to achieve about a 5% to a 30% total weight loss, and then parfrying the dehydrated comestible at about 270° F. to about 340° F. for up to about 3 minutes. The parfried comestible may then be frozen and then finish fried or alternatively may immediately be finish-fried. The resulting comestible has an appetizing flavor, texture and has up to a 40% reduced fat content as compared to conventionally prepared deep fried goods.

36 Claims, 2 Drawing Sheets

METHOD OF MAKING REDUCED FAT DEEP FRIED COMESTIBLES AND PRODUCT THEREOF

FIELD OF THE INVENTION

This invention relates to the method of producing deep fried comestibles which have up to about a 40% reduced fat content as compared to conventionally prepared deep fried comestibles. Along with a lower fat content, the deep fried comestibles are delicious and have an appetizing texture. Particularly, the invention relates to deep fried potato goods. More specifically the invention relates to a novel coating material comprising calcium and ungelatinized amylose which is applied to potato products before frying to reduce the amount of fat which is absorbed by the potato. The invention also relates to the improved fried product resulting from practicing the method.

BACKGROUND OF THE INVENTION

Deep fried foods such as french fries and potato chips are quick, appetizing foods. However, deep fried foods have been losing popularity due to the fitness craze and the average consumer's heightened awareness of the fat content of food they ingest. The average french fry having a 9/32"×9/32" cross section contains about 14–18% fat by weight which causes most fat-conscious consumers to avoid french fries altogether.

When foods are formulated to be low-fat, the low-fat product generally suffers in texture and flavor. The aim of this invention is to produce a reduced fat french fry which does not suffer the deleterious effects generally associated with low-fat foodstuffs.

U.S. Pat. No. 3,397,993 discloses a conventional process for preparing french fries. The process of the '993 patent is diagrammed in FIG. 1. First the potatoes are washed, peeled and cut into elongated strips. The strips are then washed to remove the free starch remaining on the surface. Next the potato strips are blanched in steam (about 2 to 10 minutes at about 200° F. to 212° F.) or water (160° F. to 200° F. for 3 to 8 minutes) until they turn to a generally translucent condition throughout. The strips are then dehydrated to effect a weight loss of from 20–30% by blowing 150° to 350° F. air on the strips for 5 to 20 minutes. Following dehydration, the strips are partially deep fat fried (parfried) for from about 15–60 seconds at a temperature of about 300° F. to about 375° F. After the partial fry, the strips are frozen down to about 0° F. When the frozen product is prepared by the final user, it is finish fried in a suitable oil for about 1.5 to 3 minutes at about 300–375° F.

A common practice in the art is to dip the blanched strips into a 0.5 to 0.75% sodium acid pyrophosphate (SAPP) solution for up to about 5 minutes before dehydrating the strips. The SAPP acts as a color brightener. Dextrose, which acts as a coloring agent, may additionally be added to the solution to help turn the french fries to a golden brown color. This step helps to create a product with a more uniform surface color and may be added or entirely omitted depending on the sugar content of the potato used.

Coatings have been used in the art to create a barrier to limit fat absorption during deep fat frying and to improve the texture of deep-fried potato products. U.S. Pat. No. 3,751,268 discloses coating a potato with a slurry at about 120° F. to 180° F. containing about 6.5% ungelatinized high amylose starch and then frying the potato at about 325° F. to about 380° F. to gelatinize the amylose. The high amylose starch has an amylose content of more than 50% by weight. The '268 patent discloses that using this process results in a french fry having about 10%–20% less oil than conventionally prepared french fries.

Amylose coatings have further been used to improve the crisp texture of deep fried potato products. U.S. Pat. No. 3,597,227 discloses coating a potato with a hot gelatinized aqueous dispersion of amylose. The '227 patent further mentions that a calcium lactate treatment may be completed before coating the potatoes with the hot amylose dispersion to aid in creating a crisp textured french fry.

Calcium has been added to potatoes in producing deep fried potato products to enhance the texture of the resulting french fries and potato chips. U.S. Pat. No. 4,272,554 discloses the use of calcium to inhibit blister formation in potato chips. The '554 patent states that if the amount of calcium added to the potatoes is kept low the potato chips are generally less oily than their blistered counterparts. However, if the amount of calcium raises above about 1000 parts per million based on the weight of the fried chips, oiliness and brittleness of the chips increases. The '554 patent limited the amount of calcium ions in the dip solution to below about 0.2% by weight.

U.S. Pat. No. 4,254,153 lists calcium salts as one of many firming agents which can be used to improve crispness in french fries. However, the '153 patent states that such a calcium salt treatment to improve crispness and rigidity has been successful only to a limited degree and is dependent upon the condition of the raw potato. U.S. Pat. No. 3,424,59 also discloses using calcium lactate as a stiffening agent to improve the physical appearance and plate life of french fries. The '591 patent further disclosed that use of calcium lactate treatment in their process did not reduce oil absorption of the potatoes during frying.

SUMMARY OF THE INVENTION

The present invention is a method of preparing deep fried comestibles which have a reduced fat content as compared to conventionally prepared deep-fried comestibles. The method includes coating comestibles, particularly raw potatoes, with a mixture comprising ungelatinized amylose and calcium. The coated potatoes are then blanched, dried, and partially fried at about 270° F. up to about 340° F. for up to about 3 minutes. The parfried potato strips may then be frozen and then finish-fried. Alternatively, one may immediately finish-fry the partially fried potatoes without freezing beforehand. The resulting french fry has up to about a 40% lower fat content as compared to conventionally prepared french fries.

DETAILED DESCRIPTION OF THE INVENTION

Figure 1:
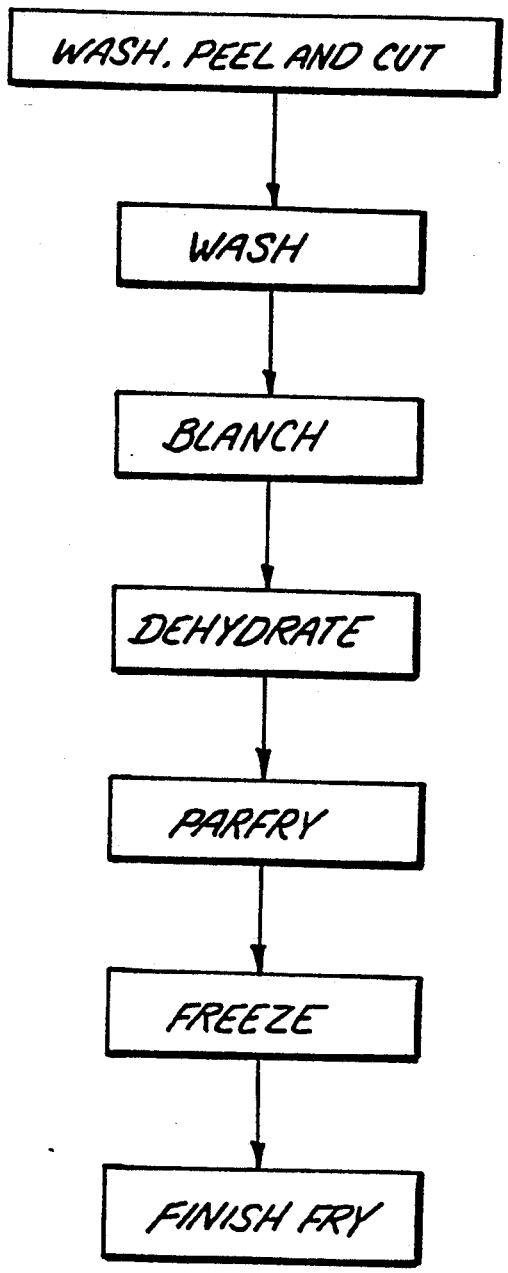
FIG. 1 is a flow diagram of the prior art method of preparing conventional french fries.
Figure 2:
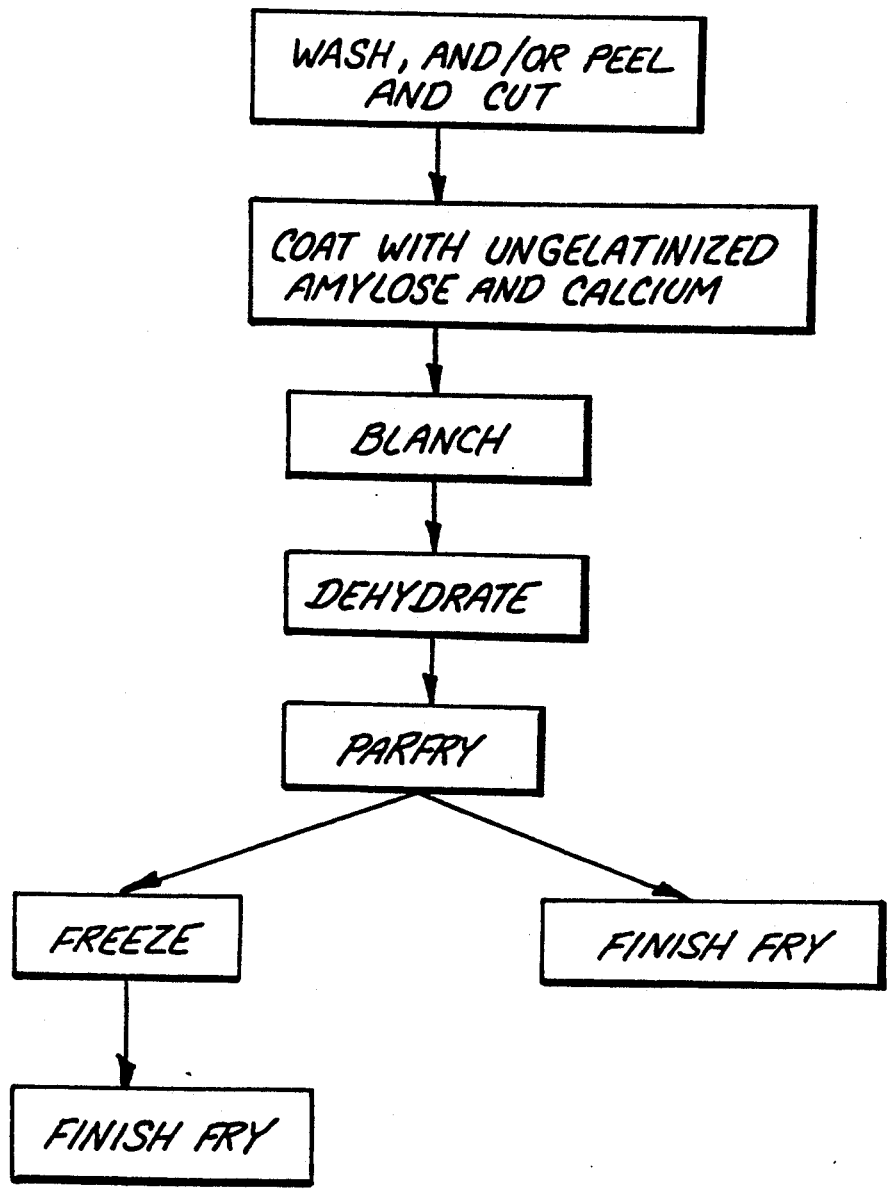
FIG. 2 is a flow diagram of the process for preparing reduced-fat french fries of the present invention.

According to the process of the present invention, as diagrammed in FIG. 2, reduced fat fried potato products are manufactured using slices of whole potatoes. The whole potatoes may be any suitable variety as are commonly used to make french fries such as Russet Burbank potatoes. Whole potatoes are cleaned, then peeled or left unpeeled. The potatoes are then cut as is typical in french fry manufacture. Potatoes may be crinkle cut, or spiral cut or cut into simple elongated strips. Preferably, potatoes are cut into elongated strips which have a cross section of about 9/32" by about 9/32".

The strips are next coated with an ungelatinized amylose and calcium ion containing mixture. The mixture may be dry in which case the potatoes are rolled in the dry mixture or dusted with the mixture. Alternatively, the amylose may be suspended in an aqueous solution of calcium lactate in which case the raw potatoes are dipped into the aqueous mixture or the mixture is sprayed onto the raw potatoes. Both methods of applying the coating mixture work equally well with the resulting products having similar reduced fat content.

Any type of water soluble calcium salt such as calcium chloride, calcium sulfamate, calcium acetate, calcium citrate, or calcium lactate to name a few may be used to provide calcium ions in the coating mixture Preferably calcium lactate as can be purchased from Qualcepts Nutrients of Minneapolis, Minn. is used because it does not impart a detectable off-flavor in the final finish-fried product. The final finish-fried product should contain about 900–1300 ppm calcium ions based on the total weight of the french fry. Preferably the final product contains about 1000 to about 1200 ppm calcium ions based on the total weight of the french fry.

In order to achieve about 900–1300 ppm calcium ions in the final product, a dry coating mixture should contain about 10–50% by weight calcium lactate or about 1.5% $Ca^{+2}$ ions up to about 7.35% $Ca^{+2}$ ions by weight. An aqueous mixture must contain about 2% up to about 12% calcium lactate by weight or about 0.3% up to about 1.8% $Ca^{+2}$ ions by weight to achieve the desired amount of calcium ions in the final product.

Starches are derived from various sources such as potato, corn, and rice. Starch is composed of two fractions, amylose which has a linear molecular arrangement, and amylopectin which has a branched molecular arrangement. Each starch is characterized by different relative proportions of the amylose and amylopectin portions. Methods for separating starch into these components are commonly known. For the purposes of this disclosure high amylose starch is defined as starch which is composed of at least about 55% amylose by weight.

Although any coating mixture which contains ungelatinized amylose and calcium ions will work to coat raw potatoes and produce reduced fat french fries, the following combinations and concentrations are preferred because they yield a quality french fry which has an appetizing flavor and texture. If a dry coating mixture is used, about 50% up to about 90% of at least about 55% by weight high amylose starch is combined with about 10% up to about 50% by weight calcium lactate. Any application method may be used to completely coat the raw potatoes with the mixture.

An aqueous mixture of calcium lactate and ungelatinized amylose may also be used to coat the raw potatoes. The aqueous mixture should contain about 2% to about 12% calcium lactate by weight, about 30% to about 40% by weight of high amylose starch, and about 48% to about 68% water by weight. Preferably, the mixture should contain about 4% to about 8% calcium lactate by weight, about 32% to about 36% by weight of high amylose starch and about 56% to about 64% by weight water. The raw potatoes are dipped into the mixture for up to about 5 minutes or until the potatoes are completely coated with the mixture.

The temperature of the coating mixture is critical. The aqueous combination must be maintained at a low temperature to ensure that the amylose does not gelatinize. Gelatinization is generally described to be the hydration and swelling of starches. High amylose starches usually gelatinize at a temperature from about 190° F. to about 198° F. For the purposes of this disclosure, ungelatinized refers to a starch wherein less than 10% of the granules have lost birefringence and no marked granule swelling has occurred. Thus, the temperature of the coating mixture must be maintained below this temperature, preferably about 100° F., more preferably at about 60° to 90° F.

The coated potatoes are then blanched to a generally translucent appearance. The blanching is done to inactivate enzymes present in the potato strips which would otherwise cause oxidation. The blanching also gelatinizes the native potato starch present in the potato strips, however, the blanching probably does not affect the amylose contained in the coating. Blanching also leaches natural sugars present in the strips, thereby giving the final product a more uniform color and appearance. The blanch step may be a steam blanch or a water blanch. A steam blanch is preferably done for about 1 minute up to about 3 minutes. Alternatively, a water blanch at about 140° F. to 200° F. for about 3 to 10 minutes may be done.

After blanching, the potatoes are then dehydrated to achieve about a 5% to about a 30% total weight loss, preferably about a 10% to about a 20% total weight loss is obtained. Any method of dehydrating may be practiced to obtain the desired weight loss, however, the dehydrating is preferably done by blowing dry air on the potato strips at about 200° F. to about 240° F. for about 5 to about 15 minutes.

The potatoes are next parfried in any suitable edible oil at about 270° F. to about 340° F. for up to about 3 minutes. Preferably the parfry is at about 280° F. to about 320° F. for about 1 to about 2 minutes. This is a relatively low parfry temperature. Although any parfry temperature and time may be used, parfrying the coated potatoes within the given range will best yield a finished product with up to about 40% fat reduction as compared to conventionally prepared french fries. After parfrying, the potatoes are only partially fried and are not yet considered ready to eat.

The parfried potatoes may be frozen in a blast freezer at about −30° F. to about −50° F. for up to about 60 minutes, preferably about 30 minutes and then stored for an extended period of time. However, the freezing step may be excluded and the parfried potatoes may be immediately finish-fried without freezing. The finish-fry is done at up to about 400° F. for about 1 to about 4 minutes, preferably at about 320° F. up to about 380° F. for about 2 to about 3 minutes. The time period and temperature for the finish fry will vary depending upon the bath size, the quantity and size of strips, their initial temperature among other factors which will be apparent to those skilled in the art.

The finish-fried french fry prepared from the parfried potato of the invention contains about 8% up to about 10% fat which is up to about a 40% reduction in fat as compared to conventionally prepared french fries. In addition to being low in fat, the french fries are delicious. Neither flavor nor texture suffer when the reduced fat content is obtained according to the process of the invention.

The french fries prepared by the process of the invention contain considerably less fat as compared to french fries coated with only calcium lactate or only amylose. Two experiments were done to compare the present invention to a calcium-coated french fry and to an amylose-coated french fry. First, raw potatoes were prepared according to the present process except that the potatoes were rolled in 100% calcium lactate. The parfried potatoes were then finish-fried. The resulting french fries had an acidic flavor and had only about a 30% fat reduction as compared to conventionally prepared french fries. Second, the invention process was followed except that the raw potatoes were rolled in 100% Amylomaize VII. Amylomaize VII is a trademark for ungelatinized, unmodified high amylose starch having an amylose content of 70% and is manufactured by American Maize-Products Company of New York, N.Y. The amylose-coated parfried potatoes were then finish-fried. The amylose-coated french fries performed even worse than their calcium lactate-coated counterparts. The amylose-coated french fries were wholly unpalatable due to their gritty mouthfeel and soggy texture. Additionally, the amylose-coated french fries had only about a 25% fat reduction as compared to conventionally prepared french fries.

Additional steps may be practiced within the process of the invention without departing from the spirit and scope of the invention. For instance, about a 0.5% to about a 0.75% by weight SAPP dip as is commonly known in the art may be included in the process either before or after the blanching step. The dip may further include up to about 3% by weight dextrose. The content of the dip and whether or not the dip is included at all is season-dependent. One skilled in the art may decide to insert or omit the step. The SAPP is an antioxidant which improves the color of the finished fry by brightening the color. The dextrose is a coloring agent as well. Both help to create a more uniform-colored french fry. Although the SAPP-dextrose dip is optional, it may be done at about 130° F. to about 170° F. for up to about 1 minute.

Another optional step which may be included in the process of the invention is an equilibration step which may be practiced after dehydrating. This is another step which is commonly practiced in the manufacture of french fries, it permits equalization of moisture distribution in the strips. An equilibration step at room temperature for up to about 6 minutes may optionally be added within the scope of the invention.

Not intending to be bound by theory, it is believed that the novel coating mixture and method of processing french fries of the invention develops a tougher exterior cell layer on the raw potatoes. Thus, less oil penetrates the exterior cell layer and less oil is absorbed into the potato strip during parfrying and during finish frying. A reduced fat french fry results. It is further believed that the calcium ions in the mixture contribute to the success of the invention by reacting with the pectin in the exterior cells of the raw potato. Insoluble calcium pectates are formed which create linkages between pectin molecules and increase intercellular adhesion. Thus, the present invention will be useful in reducing fat content in any pectin-containing deep fried comestible.

We claim:

1. A method for producing reduced fat deep fried comestibles said method comprising the step of coating the raw comestible with a mixture comprising water, ungelatinized amylose contributed from a starch having at least about 55% amylose content, said starch present in a concentration of about 50 wt-% to 90 wt-% and calcium present in a concentration of about 0.3 wt-% to 1.8 wt-% $Ca^{+2}$ ions, and said coating is held at a temperature of about 100° F. or less.

2. The method of claim 1 further comprising blanching said coated comestible, dehydrating said blanched comestible and then parfrying said dehydrated comestible.

3. The method of claim 1 wherein said calcium in said mixture is contributed from a water soluble calcium salt.

4. The method of claim 1 wherein said calcium in said mixture is contributed from calcium lactate.

5. The method of claim 1 wherein said mixture is comprised of about 2% to about 12% calcium lactate by weight and about 30% to about 40% ungelatinized amylose starch by weight and about 48% to about 68% water by weight, wherein said starch is at least 55% amylose by weight.

6. The method of claim 1 wherein said mixture is at about ambient temperature.

7. The method of claim 1 wherein said mixture is at about 60° F. to about 90° F.

8. The method of claim 1 further comprising the cleaning, and/or peeling, and cutting of said comestible before coating said comestible with said mixture.

9. The method of claim 1 wherein said comestible contains pectin.

10. The method of claim 1 wherein said comestible is potato.

11. The method of claim 2 wherein said blanching is steam blanching for about 1 to about 3 minutes.

12. The method of claim 2 wherein said blanching is a water blanch at about 140° F. to about 180° F. for about 6 to about 10 minutes.

13. The method of claim 2 wherein said dehydration is for a sufficient time at a sufficient temperature to result in about a 5% to about a 30% total weight loss in said comestible.

14. The method of claim 2 wherein said dehydration is done at about 200° F. to about 240° F. for about 5 to 15 minutes.

15. The method of claim 2 wherein said parfry is at about 270° F. to about 340° F. for up to about 3 minutes.

16. The method of claim 2 further comprising freezing said comestible after parfrying.

17. The method of claim 2 further comprising finish frying said parfried comestible.

18. The comestible resulting from the method of claim 1, 2, 16, or 17.

19. A method of producing parfried comestibles which when finish fried have a reduced fat content, comprising:
 a) coating the comestible with a mixture comprising calcium and ungelatinized amylose contributed from starch having at least about 55% amylose content, wherein said mixture is held at about 100° F. or less and comprised of water, about 50% to about 90% ungelatinized amylose starch by weight and about 10% to about 50% calcium lactate by weight;
 b) blanching said coated comestible;
 c) dehydrating said comestible; and
 d) parfrying said comestible.

20. The method of claim 19 wherein said calcium in said mixture is contributed from calcium lactate.

21. The method of claim 19 wherein said mixture is comprised of about 2% to about 12% calcium lactate by weight and about 30% to about 40% ungelatinized amylose starch by weight and about 48% to about 68% water by weight, wherein said starch is at least about 55% amylose by weight.

22. The method of claim 19 wherein said mixture is at about ambient temperature.

23. The method of claim 19 wherein said mixture is at about 60° F. to about 90° F.

24. The method of claim 19 wherein said blanching is steam blanching for about 1 to about 3 minutes.

25. The method of claim 19 wherein said blanching is a water blanch at about 140° F. to about 200° F. for about 3 to about 10 minutes.

26. The method of claim 19 wherein said dehydrating is for a sufficient period of time and temperature to result in a total weight loss of said comestible of about 5% to about 30%.

27. The method of claim 19 wherein said dehydrating is at about 200° F. to about 240° F. for about 5 to about 15 minutes.

28. The method of claim 19 wherein said parfry is at about 270° F. to about 340° F. for up to about 3 minutes.

29. The method of claim 19 further comprising the step of cleaning, and/or peeling, and cutting said comestible before step (a).

30. The method of claim 19 further comprising step (e) freezing said comestible.

31. The method of claim 19 wherein said coating is accomplished by dusting said comestible with a dry mixture.

32. The method of claim 19 wherein said coating is accomplished by dipping said comestible into an aqueous mixture.

33. The method of claim 19 wherein said comestible contains pectin.

34. The method of claim 19 wherein said comestible is potato.

35. The method of claim 19 further comprising finish frying said parfried comestible.

36. The comestible resulting from the method of claims 19, 30, or 35.

* * * * *